May 21, 1963  E. K. WAGNER  3,090,266
APPARATUS TO PROVIDE CONSTANT FACING SPEED
Filed April 29, 1957  4 Sheets-Sheet 1

INVENTOR
ELMER K. WAGNER
by: Carlson, Pitzner, Hubbard & Wolfe
ATTYS.

May 21, 1963

E. K. WAGNER 3,090,266

APPARATUS TO PROVIDE CONSTANT FACING SPEED

Filed April 29, 1957

INVENTOR
ELMER K. WAGNER
by: Carlson, Pitzner,
Hubbard & Wolfe
ATT'YS

May 21, 1963 E. K. WAGNER 3,090,266
APPARATUS TO PROVIDE CONSTANT FACING SPEED
Filed April 29, 1957 4 Sheets-Sheet 3
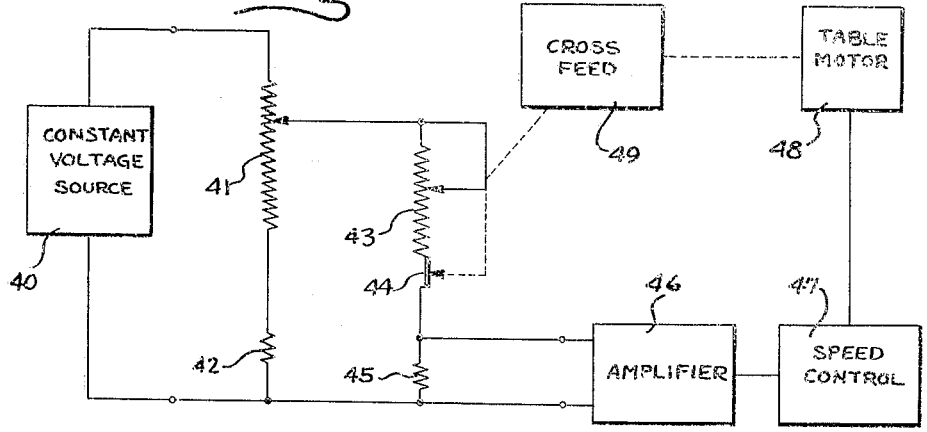
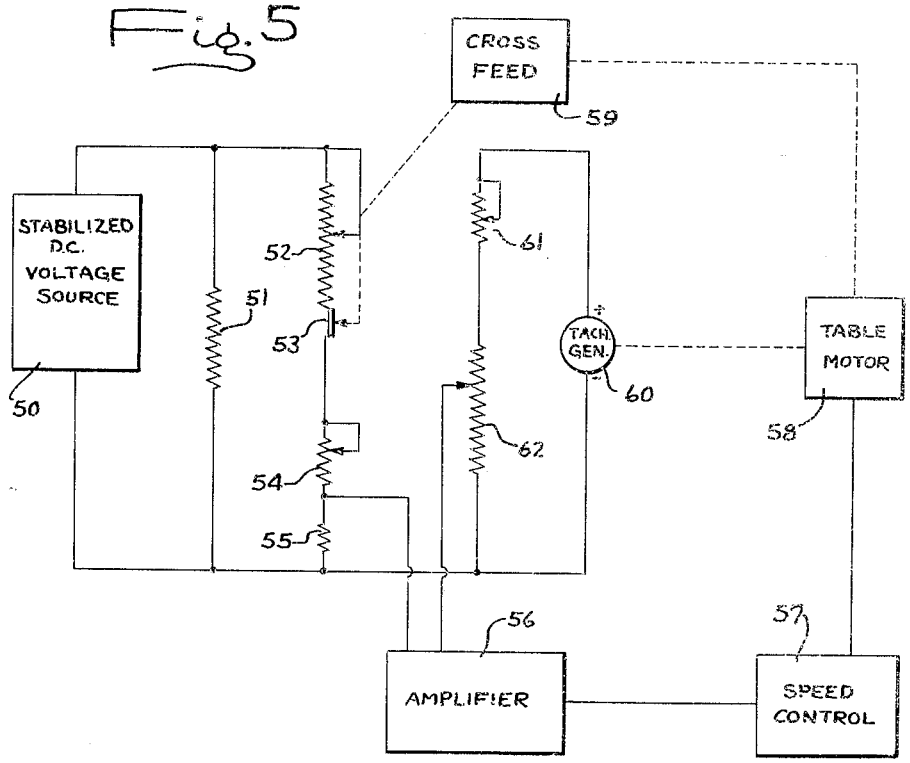
INVENTOR
ELMER K. WAGNER
by: Carlson, Pitzner, Hubbard & Wolfe
ATTYS May 21, 1963   E. K. WAGNER   3,090,266
APPARATUS TO PROVIDE CONSTANT FACING SPEED
Filed April 29, 1957                              4 Sheets-Sheet 4
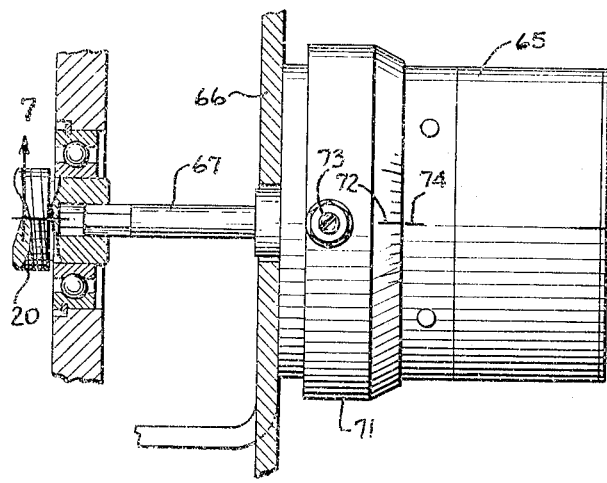
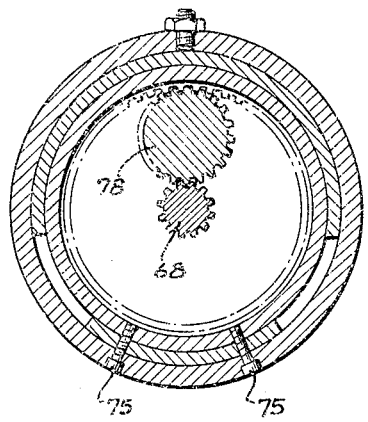
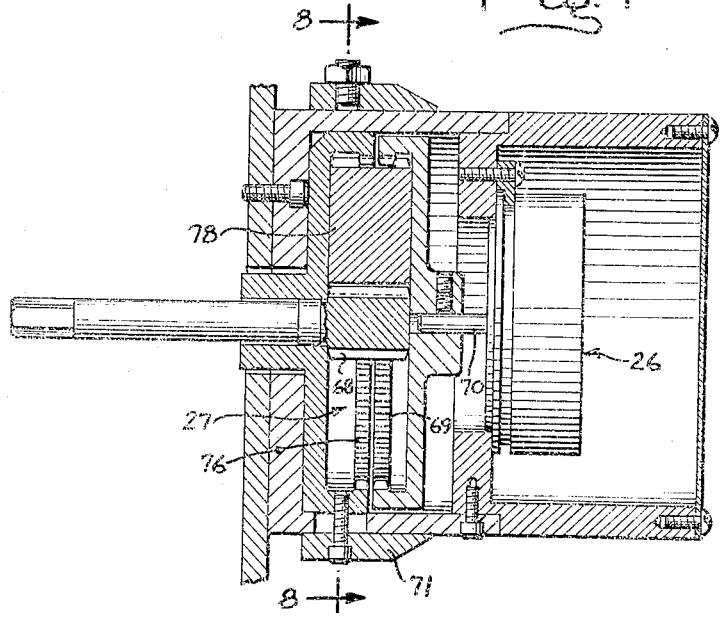
INVENTOR
ELMER K. WAGNER
by: Carlson, Pitzner, Hubbard & Wolfe
ATTYS.

United States Patent Office 3,090,266
Patented May 21, 1963

3,090,266
APPARATUS TO PROVIDE CONSTANT
FACING SPEED
Elmer K. Wagner, Rockford, Ill., assignor to Giddings &
Lewis Machine Tool Company, Fond du Lac, Wis., a
corporation of Wisconsin
Filed Apr. 29, 1957, Ser. No. 655,608
1 Claim. (Cl. 82—2)

This invention relates to means for controlling facing speed in a rotary machine tool. It is a continuation in part of my co-pending application S.N. 255,103, filed November 6, 1951, and assigned to the assignee of the present invention now abandoned.

For the purposes of this invention a rotary machine tool may be regarded as a machine which produces relative rotation of the workpiece holder and the cutting tool in order to perform machining operations upon a workpiece. Such machines are often used to make facing cuts on the workpiece, i.e., to machine surfaces which extend generally transverse to rotary axis of the machine. Surfaces of this type may be tapered or contoured surfaces, as well as the flat transverse face, and they are significant as such when change in radius during the operation is large enough to justify maintenance of constant linear speed between the tool and the workpiece. Machines typically involved are vertical and horizontal boring mills, lathes and facing mills. In making such facing cuts a cross-feeding means is applied to produce relative radial movement between the cutting tool and the axis of rotation of the workpiece holder or machine table. As a rule, the tool is moved radially while the axis of workpiece rotation remains stationary. It will be recognized that if the rotational speed remains constant as the tool is radially fed, the facing or cutting speed changes, varying in direct proportion with the cutting or facing radius.

The cutting tool removes material from the workpiece most efficiently when the cutting is done in a certain predetermined speed. If this speed is exceeded, the cutting tool may be damaged or worn at an excessive rate. A cutting speed less than the maximum efficient speed wastes valuable production time. For wide radius cuts in which the maximum radius is several times the minimum radius, the advantages of closely following the desired constant facing or cutting speed for all radii permitted by the machine rotary speed limitations are particularly significant. Since this is difficult to accomplish by manual speed setting control or by belt-change steps, it is an object of my invention to provide a method and apparatus for maintaining a desired constant facing speed over the maximum radius range permitted by the rotary speed limitations of the machine tool.

The maximum rotary speed is limited in any economically practical variable speed drive. A slight tool offset with respect to the axis of workpiece rotation provides enough relative movement between the tool and work to finish a cut at zero radius, but obviously the increase of rotary speed to approach infinity as would be required to maintain constant cutting speed near zero radius is neither possible nor profitable in view of the very small area involved. It is desirable, however, that the minimum cutting radius in a continuous operation should not be limited to that critical radius below which the rotary speed needed for constant facing speed exceeds the maximum available. Neither is it desirable to compromise by changing the speed gradually over a radius range embracing the critical radius in such a fashion so that the approach to the maximum rotary speed at zero or minimum radius results in a departure from the desired linear cutting speed at radii above the critical radius. It is, therefore, a further object of my invention to provide an automatic cutting or facing speed control for wide cutting ranges embracing the critical radius which closely follows the desired constant cutting speed for all radii above the critical radius.

Since the electric speed changing drives available for rotating the workpiece relative to the tool are susceptible of continuous and gradual speed control, it is another object of the invention to provide an electrical voltage having a linear relationship to the rotary speed required for constant cutting speed. A still further object is to provide a simple control system which can be manufactured economically from readily obtainable components. Another object is to provide a versatile control method and apparatus which provides constant cutting speed compliance within a range of cutting speed values available for different materials and cutting conditions.

In accordance with one aspect of my invention, a resistance network divides a pre-set voltage applied across it to yield a voltage which varies linearly as the machine tool rotary speed required to provide a constant facing or cutting speed for all radii above a given radius established as the unit radius. The control voltage appears across all or part of a unit resistance. The remaining series resistance is variable and is coupled to the cross feed to increase linearly by an amount of one unit resistance per unit radius with increasing radius starting with zero resistance at unit radius. In accordance with another aspect of the invention, the variable resistance in the series circuit remains at zero resistance for all cutting radii below the unit radius to maintain the maximum rotary speed without interruption.

These and other objects, advantages and features of the invention will appear from the following description of an illustrative embodiment of the invention, the description being taken in connection with the accompanying drawings in which:

FIG. 4 is a diagram of the control circuit and drive with facing-speed selection means;

FIG. 5 is a circuit diagram of a modification of the control and drive showing another facing-speed selection means;

FIG. 6 is a plan view of a rail potentiometer and associated gearing which may be utilized in apparatus constructed in accordance with this invention;

FIG. 7 is a sectional front view taken along line 7—7 in FIG. 6; and

FIG. 8 is a sectional view taken along the line 8—8 in FIG. 7.

Figure 1:
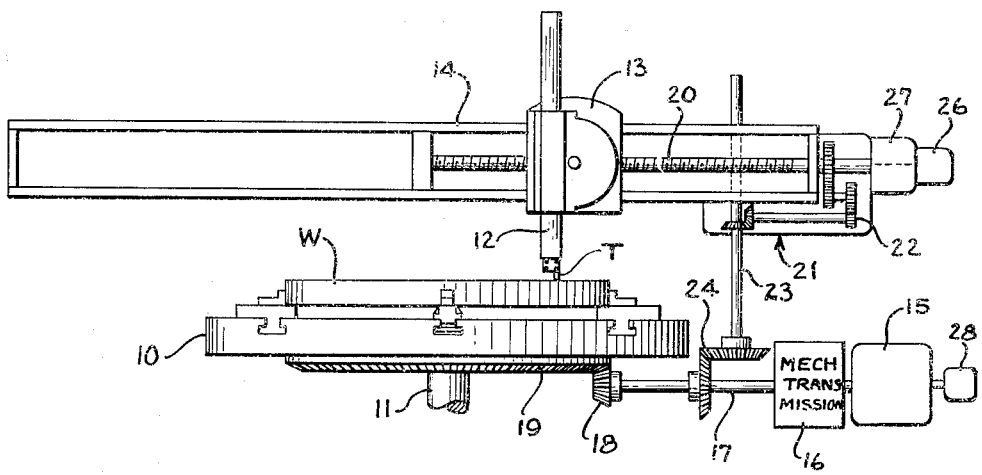
FIG. 1 is a semi-schematic view of a vertical boring mill illustrating both the relative rotation and cross feed of the work holder and tool holder, and showing the variable resistance of the control network.

While the invention is susceptible of various modifications and alternative constructions, there are shown in the drawings and will herein be described in detail the preferred embodiments, but it is to be understood that it is not thereby intended to limit the invention to the forms disclosed, but it is intended to cover all modifications, equivalents and alternative constructions falling within the spirit and scope of the invention as expressed in the appended claim.

In FIG. 1, a rotary machine tool is illustrated which in this case takes the form of a vertical boring mill. In order to hold a workpiece W, the mill is provided with a circular table 10 which is rotatably mounted by means including a vertical spindle 11. The workpiece is thereby carried for relative rotation with respect to a cutting tool T which is mounted at the lower end of a tool holding ram 12. The ram is supported for generally vertical reciprocating movement by means of a saddle 13 which is movable along a horizontal crossrail 14 positioned above the table 10. The rail 14 is conventionally supported for vertical adjustment on upright side supports (not shown).

Relative rotation of the workpiece and the cutting tool is produced by means of a variable speed motor 15 which may suitably be a direct current electric motor. The motor is suitably coupled to the table 10 through a reduction gear transmission 16 having an output drive shaft 17 carrying a bevel gear drive 18. The gear 18 meshes with a circular rack 19 on the underside of the table 10 to rotate the table and workpiece on it at a speed corresponding to the motor speed. The gear transmission may have multiple speeds to extend the table speed range in instances where the motor speed range is limited.

A cross feeding means produces relative cross feeding motion of the cutting tool and the axis of rotation of the table 10. In the structure illustrated the cross feeding means utilizes a cross feed screw 20 carried by the cross rail 14 for moving the saddle 13 along the rail.

A cross feed drive 21 preferably including speed changing gears 22 for setting the cross feeding speed rotates the screw and this adjusts the radial position of the tool T. A vertical splined driveshaft 23, suitably coupled by bevel gears 24 to the table driveshaft 17, accommodates the vertical shifting of the rail 14 through a bevel gear 25 of the cross feed drive and slidable longitudinally of the splined shaft. Such a feed drive provides a continuous tool feed which is related directly to the table speed so that the tool feed per revolution of the table remains constant. While the tool radius as affects the linear or facing speed between the tool and the work, the speed itself of the feed is a negligible part of the facing speed.

In accordance with the invention, the table speed is carefully controlled to provide optimum correspondence between the tool feed and the table rotary speed for maintaining constant cutting speed. Toward this end a resistance network is employed, a part of which appears as a potentiometer 26 connected through reduction gearing 27 to the cross feed screw 22. A tachometer generator 28, coupled to the motor 15, generates a voltage proportional to the motor speed and is useful as an indicator or followup control.

Figure 2A:
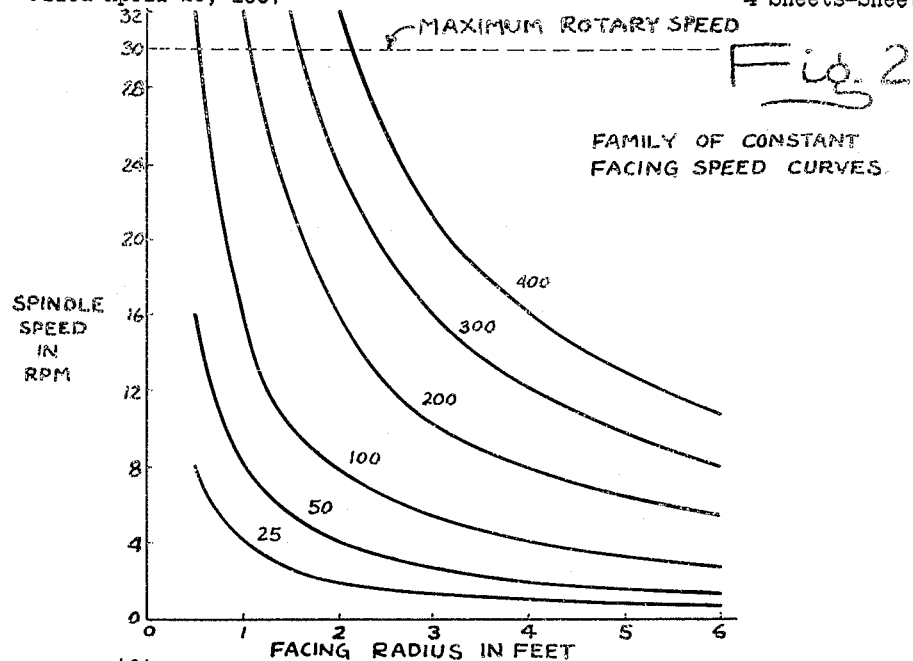
FIG. 2a is a family of constant facing speed curves plotted in spindle speed versus cutting radius for the apparatus of FIG. 1.

The desirability of maintaining a constant facing speed for wide cutting radius ranges need not be belabored. FIG. 2a illustrates the variation of table speeds required for wide facing ranges, which may be defined as those for which the maximum radius to be cut is several times the critical radius at which the cutting speed is to be maintained. Referring to the dimensions of the exemplary embodiment of FIG. 1, the curves show a cutting radius from zero to 6 feet. For this table the spindle drive has a speed limit as also indicated in FIG. 2a, of 30 r.p.m. The power requirements for acceleration of the several tons mass of the rotary table and the workpiece and the high peripheral velocity make higher speeds unsafe or uneconomic. Cutting speeds from 25 feet per minute to 400 feet per minute are illustrated by the curves of FIG. 2a, and are usually about 100 feet per minute or greater in modern practice. Each of these curves is hyperbolic in that for all points on any one curve, the product of the radius and the cutting speed is a constant. It will be appreciated that curves for any intermediate feet per minute cutting or facing speed are simply derived by plotting the speed in r.p.m. against the tool radius in feet in accordance with the function $$\text{R.p.m.} = \frac{\text{desired feet per minute cutting speed}}{2\pi \times \text{cutting radius in feet}}$$

Each of the curves illustrated are truly hyperbolic despite the seemingly different shapes, due to the effective expansion or shrinking of the coordinate scales with different facing speeds. Thus the rate of change at a particular radius is not the same for different cutting speeds and a linear speed change which might approximate a portion of the constant facing curve may thus be entirely inadequate as an approximation to the rotary speed change required at other radial ranges or at other cutting speeds.

Figure 2B:
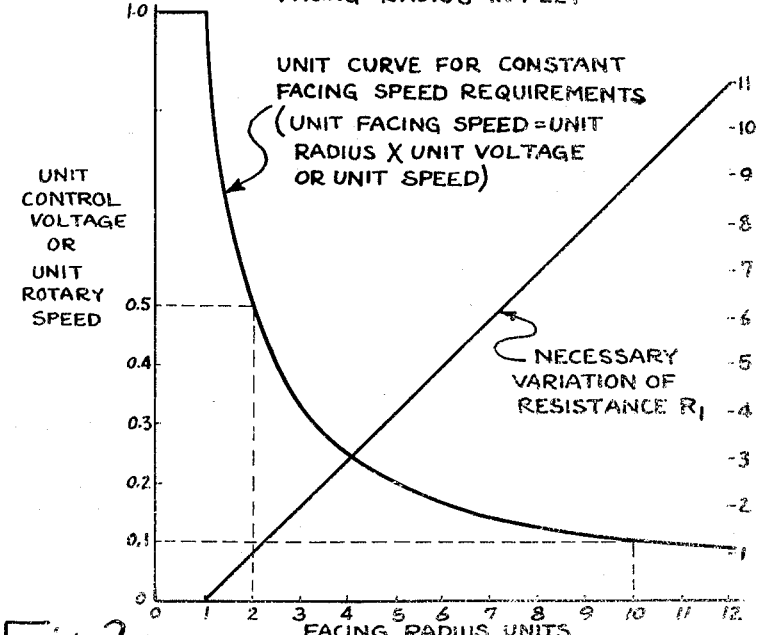
FIG. 2b is a generalized unit curve for constant facing speed requirements independently of the dimensions of FIG. 2a and showing the required resistance variation.

FIG. 2b generalizes the hyperbolic relationship of the rotary speed versus facing radius in terms of a unit rotary speed which, multiplied by the radius units equals the unit linear or facing speed. For example, at a radius of ten units the rotary speed would be one tenth of unit speed. At a cutting radius of two units, the rotary speed would necessarily be one half the rotary speed unit, and at one unit radius limit rotary speed is required. Of course, the limit conditions for constant cutting speed are not shown because they do not have a physical meaning. Thus, zero rotary speed would require an infinite cutting radius and zero cutting radius require an infinite rotary speed. The rotary speed remains at a constant maximum level for all radii below the unit or cross-over radius. Very little area is involved in machining below the small radius selected as unit radius and no appreciable time would be saved by increasing the rotary speed as the cutting radius nears zero, even if that were physically possible. The unit radius is, however, an appreciable finite amount. Translated to the scale of the machine tool table of FIG. 1, it was suitably established as six inches (one-twelfth) of the maximum six foot cutting radius.

Since speed controls for varying a motor speed linearly with the amplitude of the control voltage are known and available, the problem of producing the constant facing speed desired is solved if a control voltage varying with the cutting radius in the same manner as the desired rotary speed can be obtained. Thus, the ordinates of FIG. 2b may represent the unit voltage as well as the unit rotary speed. The variation of a resistance as part of a particularly dimensioned network shown in FIG. 2b, provides the key to producing the desired control voltage. The particular way of realizing it and its significance are vital to an understanding of the invention.

Figure 2C:
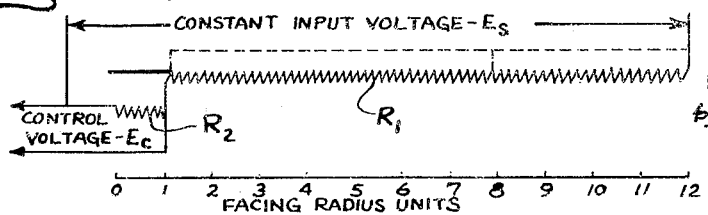
FIG. 2c is a semi-schematic representation of the resistance network illustrating its relationship to the unit radius range of FIG. 2b.

Turning now to FIG. 2c, a representation of the resistance network embodying my invention is shown in semi-schematic relationship to the unit radius scale of FIG. 2b. The network, in a simplified form, has a variable resistor $R_1$ and a fixed resistor $R_2$ connected in series across a fixed voltage source. Output voltage terminals are connected across all or part of the fixed resistor to provide the desired control voltage. The variable resistor $R_1$, as indicated in FIG. 2c has a resistance which varies linearly with the facing radius suitably by varying a tap position. The tap is coupled to the cross-feed mechanism of the machine tool so that the tap reaches zero resistance, not at zero radius, but at the unit radius selected for the constant cutting speed limit or crossover point at the high end of the rotary speed scale. This linear variation of the resistance with cutting or facing radius, it is emphasized, starts at the unit cutting radius and increases with the radius as illustrated in FIG. 2b (where the right hand ordinate scale relates to resistance units.

Because the minimum radius requirement may call for cutting the workpiece down to zero radius, and to accommodate this requirement without impairing the ideal response desired in the unit radius to maximum radius range, the tap of the variable resistor $R_1$ remains at the zero resistance position for cutting radii below the unit radius. This is indicated by the solid line at the end of the resistor representing a conductor which connects the tap to the resistor end at radii below the unit radius.

The fixed resistance $R_2$ has a very definitely established value equal to the unit radius times the linear resistivity of the variable resistor. Thus the fixed resistor is the unit resistance for the unit radius selected. If the resistance of $R_2$ equals one ohm (or higher resistance unit) the variable resistance $R_1$ would vary linearly from zero to eleven times the resistance unit as the unit radius increases over eleven radius units from 1 to 12.

That this solution for proportioning the voltage dividing network in relation to the cross feed is valid for the optimum constant cutting speed control voltage may also be demonstrated by simple equations. Thus the control voltage $E_c$ appearing across the resistor $R_2$ is equal to or less than the supply voltage $E_s$ depending upon the value of $R_1$ as determined by the radial position of the tool holder:

$$E_c = E_s \times \frac{R_2}{R_1 + R_2}$$

Recognizing that the instantaneous value of $R_1$ varies linearly with the cutting radius units above one unit, $$R_1 = R_2 \text{ (radius units} - 1)$$

(when the facing radius units exceed one).

Combining the equations, the required hyperbolic relation is demonstrated:

$$E_c = E_s / \text{radius units}$$

(when the facing radius units exceed one).

In designing the equipment or in adjusting and setting the various voltages and resistances the unit rule is applied in the same manner for accommodating either a single set of operating conditions or for general purpose operation at various cutting speeds.

With respect to FIG. 1, the choice of a six inch radius as the unit radius approximated the cross-over point where, at cutting speeds of approximately 100 feet per minute, the maximum available rotary speed is reached. However, the same unit radius, the same resistance network, and the same resistance to feed coupling could be employed for any facing or cutting speeds shown in FIG. 2a. However, should it be desired to utilize this equipment primarily or solely at much lower cutting speeds, for example, at the 25 feet per minute speed, the table speed limit of 30 r.p.m. would not be reached unless the unit radius were approximately .13 feet (1½ inches) or less. To maintain optimum compliance with the constant cutting speed within the limits of the machine, the resistor $R_1$ would be coupled to the cross feed on the basis of 1½ inches as the unit radius. That is, if the fixed resistor $R_2$ were equal to say 10 ohms for example, the value of the variable resistor $R_2$ would be zero up to 1½ inches, at which radius it would start increasing in resistance at the rate of 10 ohms with every increase of 1½ inches in cutting radius.

In no case is the unit radius made zero, nor should it approach zero so closely that the unit resistance would bear an unmanageably small proportion to the resistance of $R_1$ in terms of the required accuracy of variable resistance change with distance of the tool from the unit radius.

While the 6 inch radius in this particular example represents a typical and workable unit radius with respect to the radius and speed ranges illustrated, the unit radius can of course, be increased beyond 6 inches. No increase in machining time would be involved so long as the rotary speed called for at the unit radius for a particular facing speed is not less than the maximum available rotary speed. As before, the resistance relationships and feed coupling would require adjustment to meet the revised unit radius and unit resistance. If the rotary speed limit is reached before the cut is finished at a high facing speed while the radius is still above the unit radius, the drive may be simply permitted to continue at the maximum available speed.

Figure 3:
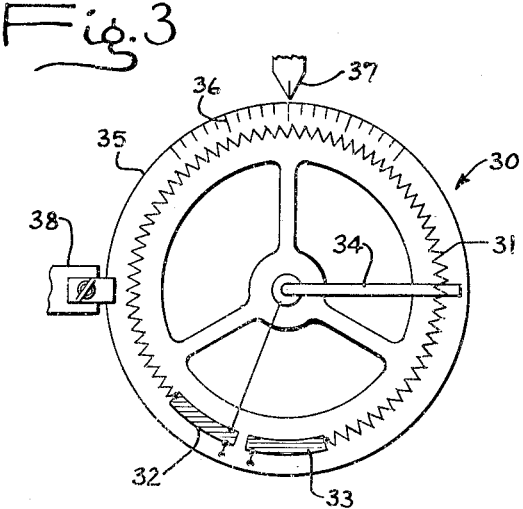
FIG. 3 is a diagramamtic view of a variable resistor forming part of the apparatus of FIG. 1 and part of the circuit of FIG. 2c.

Referring now to FIG. 3, the variable resistor $R_1$ may suitably take the form of a linear rotary potentiometer 30, having a resistance element 31 suitably and conventionally a linearly wound resistance wire offering small turn-to-turn increments. In this particular example of a commonly available type of potentiometer, the resistance extends through approximately 260 degrees of circular arc between conductive or short circuited end turn positions 32 and 33. Each end conductor extends about 45 degrees. A rotatable slider 34 makes essentially a point contact with the resistance element 34 and is suitably connected to one of the end terminals 32 so that the potentiometer functions as a two-terminal rheostat or variable resistor rather than as a voltage divider. The other conductive end portion 33 permits the tap or slider to remain at zero resistance (short circuiting the resistance $R_2$) at radii below the unit radius without uncoupling the tap from the cross feed. An especially desirable feature of the potentiometer used as resistor $R_1$ is the fact that it is linearly wound to provide a fixed ohms per angular degree resistivity. A linear cross feed coupling without resort to cams or to non-linear rheostats yields the desired linear ohms per radial inch change. While the linear resistivity is conveniently expressed in unit resistance per unit radius, the resistance increments are readily made small enough for continuous control. The resistance of $R_2$, on the other hand, is equal to the same resistivity times the unit radius but it is not varied with the cutting radius and requires no paricular linear distribution.

Because the cutting tool is likely to be offset from the center line of the saddle in different amounts in different tool set-ups precautions should be taken to maintain accuracy. One arrangement is indicated in FIG. 3 by which the potentiometer structure is angularly adjusted to compensate for the offset. As shown in this instance the support frame 35 of the potentiometer 30 is rotatable for a few degrees with respect to the cross arm structure. As indicated in FIG. 3, the support bears marks or graduations 36, and a stationary pointer or reference mark 37 is positioned opposite them to indicate the amount of offset. A manually operable clamp 38 suitably locks the support in the selected position. The position of the resistance element 44 should be adjusted so that the tool reaches the zero resistance end of the element when the cutting radius for the particular tool set-up equals the unit amount.

It will be appreciated that the linear relationship of the spindle speed to the control voltage derived from resistor $R_2$ can be obtained with a number of control systems available in the art. Two examples, those of FIGS. 4 and 5, illustrate complete systems and further show different means for selecting the cutting speed for versatility of control without affecting the linear response and basic simplicity of the network of FIG. 2c.

FIG. 4, for example, illustrates a facing speed setting means particularly applicable where the armature voltage of a direct current motor is varied to control the motor speed. Speed ranges of the order of 20 to 1 are readily obtained with such systems without belt or gear changing. As shown, a stabilized source of voltage 40 provides a constant voltage drop across a voltage dividing resistance potentiometer 41. Resistor 42 represents the minimum resistance left in the circuit to avoid short circuit. The potentiometer 41 functions as the facing speed selector and determines the magnitude of the voltage supplied to the facing speed control network. This network has a rheostat 43 (as resistance $R_1$) and a fixed resistor 44 (as resistance $R_2$) in series. As previously described, the fixed resistance 45 is the unit resistance and the tap of resistor 43 is coupled to the cross-feed to vary from zero resistance at the selected unit radius to full resistance at the maximum radius. The conductive portion 44 of resistor 43 represents the means for permitting the resistor 43 to remain short-circuited at facing radii below the unit radius.

The voltage appearing across the first resistor 45 is preferably first amplified in amplifier 46 and supplied to a linear speed control 47 of the motor 48 for rotating the work table 48 at a speed varying linearly with the voltage across resistor 45. The resistance 43 of the facing speed control network is varied in accordance with the position of the tool by its mechanical coupling to the cross feed means 49. As previously described, cross feed means 49 is suitably coupled to the table motor 48. With the unit radius selected as in FIG. 2c suitable values for the rheostat 43 and the fixed resistor 45 are respectively zero to 22,000 ohms and 2,000 ohms. To avoid shifting the effective division of voltage by the speed setting potentiometer 41 during change of resistance 43, its total resistance is much lower than that of resistor 45. It may be of the order of 25 ohms, for example.

In operation of a system like that of FIG. 4, the facing speed selector potentiometer controls the maximum voltage which can appear across the resistor 45. With the full voltage of the source 40 appearing across the facing speed control network the highest facing speed is called for. With the tap of potentiometer 41 lowered, the facing speed control network will cause the table speed to comply with a lower facing speed. For convenience, the facing speed selector or setting potentiometer may be located in a pendant station adjacent to the worktable. The potentiometer 41 may be calibrated so that the position of its tap indicates the cutting speed called for. It will be appreciated, of course, that the calibration depends upon the particular selection of unit radius as previously described.

FIG. 5 illustrates a control system particularly useful for field control of the spindle drive motor or for any drive in which linear following of the input control voltage requires a feed-back or follow-up network. As shown in FIG. 5, a direct current source 50 provides a voltage across a relatively low resistance load resistor 51 so that a stabilized constant reference voltage is provided. In actual embodiment this has been set at 4.0 volts. This voltage, regardless of the cutting speed selected, is supplied across the cutting speed control network consisting of a rheostat 52 (corresponding to resistance $R_1$) and the unit series resistance of an adjustable resistor 54 and fixed resistor 55 (corresponding to fixed resistance $R_2$). The rheostat 52 may suitably include a conductive portion 53 for retaining contact with the tap at cutting radii below the unit ratings. The adjustable resistor 54 adds no new variable in the operation of the circuit but is useful for setting the total unit resistance to the value called for by the unit radius and linear resistivity of rheostat 52 actually realized with the cross-feed coupling as installed. Once adjusted, the resistor 54 not not be changed. Only the voltage developed across resistor 55 is applied to the amplifier 56 in this instance, the division of the control voltage derived from the unit resistance 54 and 55 being a matter of design convenience. The amplifier preferably has a negligible loading effect; obviously, the amplifier input resistance, if low, should be taken into account in measuring the unit resistance.

The voltage derived from the unit resistance $R_2$ of the facing speed control network is suitably compared with a speed setting voltage selected for the cutting operation, amplified, and supplied to the speed control 57 to drive the motor 58 to produce the selected constant facing speed.

As further shown in FIG. 5 the cutting speed voltage is suitably selected by means of a tachometer generator 60 coupled to the table motor to provide a direct current voltage varying linearly with the motor speed. This voltage is suitably impressed across a resistor 61 and potentiometer 62 dimensioned to provide the desired total resistance load. The voltage across the potentiometer is divided by adjusting the potentiometer tap and placed in opposing series with the control voltage from the resistor 55. The table motor is driven faster or slower according to the polarity and amplitude of the difference voltage applied to the amplifier until the speed complies with that called for. Again the speed setting 62 in the tachometer circuit may be conveniently located and calibrated to facilitate cutting speed selection.

It will be obvious, without departing from the spirit of the invention, that various forms of motor drive systems may be employed to provide linear spindle speed compliance with the cutting speed control voltage.

Because the coupling of the resistor $R_1$ (potentiometer 26 in FIG. 1) to the cross feed is significant to the practice of the invention, further reference is made to the details of the particular structural arrangement shown in FIGURES 6, 7 and 8 as a desirable embodiment. In this arrangement, means incorporated in the reduction gears 27 (FIG. 1) compensate for varying amounts of tool offset.

As illustrated in FIGS. 5, 6 and 7, the potentiometer 26 and the reduction gears 27 are supported by a dish-shaped reduction gear housing or body 65 rigidly mounted as shown on a cross rail housing 66. A pinion shaft 67 extending from the housing is connected at its outer or left hand end to the feed screw 20. A pinion 68 on the right hand end of the pinion shaft is designed to ultimately drive an internal gear 69 on the rotatable shaft 70 of the potentiometer to vary its resistance.

The coupling between the feed screw pinion 68 and the potentiometer shaft gear 70 provides both a speed reduction and adjustment of the engagement position.

Accordingly, a ring dial 71 fitted over the outside of the gear housing 65 is angularly adjustable to change the gear engagement. The ring dial has a suitably graduated portion 72 as well as a set screw 73 to lock the ring dial to the housing after adjustment. An index mark 74 on the housing faces the graduated portion of the ring dial. The ring dial carries with it, through screws 75, an internal gear 76 which is positioned adjacent to the potentiometer shaft gear 69. A planetary idler pinion 78 is rotatably confined in mesh with both internal gears 76 and 69 and with the drive pinion 27. The number of teeth in the driven internal gear 69 is slightly different from the number of teeth in the ring dial gear 76 so that a suitable speed reduction is obtained between the pinion shaft and the potentiometer shaft. For example, the driven internal gear 69 may have 61 teeth while the stationary internal gear 76 has 60 teeth.

In operation, the pinion 68 of FIGS. 6, 7 and 8 is driven by the cross-feed screw 20 to cause the planetary idler pinion 78 to roll around the stationary internal gear 76. The rolling idler pinion drives the driven internal gear 69 at a greatly reduced speed. The total gear ratio is such that the potentiometer shaft and slider complete one angular sweep of the resistance revolution while the lead screw is rotating a sufficient number of revolutions to traverse the saddle from one end of its range to the other.

The position of the body of the potentiometer 26 is adjusted initially so that the resistance $R_1$ is zero when the saddle is set for the unit cutting ratio with zero tool offsetting. While this is being done, the ring dial 21 should be in its zero reference position.

During the normal use of the machine the position of the ring dial 71 is adjusted to compensate for varying amounts of radial tool offsetting. The dial is ordinarily graduated in inches of tool offsetting so that the tool offset may be measured and the dial set accordingly. Movement of the stationary internal gear 76 secured to the ring dial rotates the planetary idler pinion 78 and thereby changes the position of the driven internal gear 69 with respect to the pinion shaft 67.

I claim as my invention:

The method of controlling a machine tool rotary drive having a speed varying linearly with the input control voltage for providing constant facing speed between the relatively rotating work and tool from a given minimum facing radius above zero to a maximum radius, which method comprises varying a first resistance from zero to maximum value at a rate linearly proportional to the difference between the facing radius and said given minimum radius, dividing a constant voltage in proportion to the total resistance of the varying resistance and a fixed resistance equal to the product of the linear rate of varying the variable resistance times said given minimum radius, and applying the voltage proportional to the fixed resistance part of the total resistance as the input voltage of the rotary drive.

References Cited in the file of this patent

UNITED STATES PATENTS

| | | |
|---|---|---|
| 660,801 | Riddell | Oct. 30, 1900 |
| 798,391 | Clark | Aug. 29, 1905 |
| 2,389,368 | King | Nov. 20, 1945 |
| 2,401,164 | King | May 28, 1946 |
| 2,561,724 | Bickel | July 24, 1951 |

FOREIGN PATENTS

| | | |
|---|---|---|
| 649,219 | Great Britain | Jan. 24, 1951 |